(12) United States Patent
Papastergiou et al.

(10) Patent No.: US 9,041,257 B2
(45) Date of Patent: May 26, 2015

(54) SYSTEM FOR DISTRIBUTING ELECTRIC POWER TO AN ELECTRICAL GRID

(71) Applicants: Konstantinos Papastergiou, Geneva (CH); Zhiguo Pan, Cary, NC (US)

(72) Inventors: Konstantinos Papastergiou, Geneva (CH); Zhiguo Pan, Cary, NC (US)

(73) Assignee: ABB RESEARCH LTD. (CH)

( * ) Notice: Subject to any disclaimer, the term of this patent is extended or adjusted under 35 U.S.C. 154(b) by 0 days.

(21) Appl. No.: 14/075,474

(22) Filed: Nov. 8, 2013

(65) Prior Publication Data

US 2014/0062221 A1   Mar. 6, 2014

Related U.S. Application Data

(63) Continuation of application No. PCT/EP2011/058829, filed on May 30, 2011.

(51) Int. Cl.
| | | |
|---|---|---|
| *H01H 71/10* | (2006.01) | |
| *H02H 9/00* | (2006.01) | |
| *H02J 3/38* | (2006.01) | |
| *H02M 1/36* | (2007.01) | |

(52) U.S. Cl.
CPC ............... *H01H 71/10* (2013.01); *H02H 9/002* (2013.01); *H02J 3/383* (2013.01); *H02M 1/36* (2013.01); *Y02E 10/563* (2013.01)

(58) Field of Classification Search
CPC .......... H01H 71/10; H02H 9/002; H02J 3/383
USPC ........................................................ 307/126
See application file for complete search history.

(56) References Cited

U.S. PATENT DOCUMENTS

| | | |
|---|---|---|
| 2003/0173939 A1 | 9/2003 | Hillberg et al. |
| 2005/0141154 A1* | 6/2005 | Consadori et al. ............... 361/62 |
| 2009/0179500 A1* | 7/2009 | Ragonese et al. ............... 307/82 |
| 2009/0295227 A1* | 12/2009 | Chang et al. .................... 307/46 |

(Continued)

FOREIGN PATENT DOCUMENTS

| | | |
|---|---|---|
| CN | 101860266 A | 10/2010 |
| EP | 1993184 A1 | 11/2008 |

(Continued)

OTHER PUBLICATIONS

Kawakami et al., "Study of a control method of fuel cell inverters connected in parallel and verification test result of an isolated micro grid", Power Convertsion Conf., Nagoy, Japan, IEEE, Piscataway, NJ, USA, Apr. 1, 2007, p. 471-476.*

(Continued)

*Primary Examiner* — Jared Fureman
*Assistant Examiner* — Joel Barnett
(74) *Attorney, Agent, or Firm* — St. Onge Steward Johnston & Reens LLC

(57) ABSTRACT

A system for distributing electric power to an electrical grid. The system includes a DC/AC inverter arranged to convert a DC voltage output from an electric power generator to an AC voltage, a transformer arranged to receive the AC voltage, transform the AC voltage and deliver the transformed AC voltage to the grid, and a connector arranged to selectively connect and disconnect the transformer from the grid. The DC/AC inverter is arranged to control primary winding magnetizing current delivered to the transformer. Further, the connector is arranged to selectively connect and disconnect the grid to and from the transformer on the basis of the controlled magnetizing current.

15 Claims, 3 Drawing Sheets

(56) References Cited

U.S. PATENT DOCUMENTS

| | | | |
|---|---|---|---|
| 2009/0316323 A1* | 12/2009 | Knopf et al. | 361/156 |
| 2010/0019578 A1* | 1/2010 | Schreiber | 307/82 |
| 2010/0090634 A1* | 4/2010 | Beck et al. | 318/480 |
| 2010/0277002 A1 | 11/2010 | Folts et al. | |
| 2011/0058397 A1* | 3/2011 | Rizzo | 363/52 |

FOREIGN PATENT DOCUMENTS

| | | |
|---|---|---|
| JP | H089555 A | 1/1996 |
| JP | H11164484 A | 6/1999 |

OTHER PUBLICATIONS

Zaltsman; "Inrush current control for equipment powered by UPSs"; pp. 19.4/1-19.4/7.

International Preliminary Report on Patentability Application No. PCT/EP2011/058829 Completed: May 23, 2013 13 pages.

International Search Report and Written Opinion of the International Searching Authority Application No. PCT/EP2011/058829 Completed: May 14, 2012; Mailing Date: May 29, 2012 13 pages.

Kawakami, et al.; "Study of a Control Method of Fuel cell Inverters Connected in Parallel and Verification Test Result of an Isolated Micro grid"; Fourth Power Conversion Conference, Apr. 2-5, 2007; pp. 471-476.

* cited by examiner

SYSTEM FOR DISTRIBUTING ELECTRIC POWER TO AN ELECTRICAL GRID

FIELD OF THE INVENTION

The present invention generally relates to a method of and system for distributing electric power to an electrical grid. The present invention further relates to a computer program product for carrying out the method.

BACKGROUND OF THE INVENTION

Medium voltage (MV) transformers step up DC/AC inverter output voltage to allow connection to an MV distribution grid. Transformer power losses consist of a) winding losses due to transformer load current and b) winding and core losses due to transformer magnetizing current.

The transformer power losses can be categorized as i) load losses during transformer operation (i.e. inverter power>0) or ii) no-load losses occurring when the transformer is idle (inverter power=0).

Studies show that the no-load losses account for up to 75% of the total transformer power losses depending on configuration and should thus preferably be eliminated or at least reduced. Consequently, the MV transformer should be disconnected when there is no power generation in the power generating means delivering a DC voltage to the inverter, which power generating means for example may be embodied in the form of a photovoltaic (PV) array.

However, connection of the transformer to the distribution grid results in an inrush current flow in the primary winding, which results in strong magnetic fields and misplacement of the windings. Consequently, insulation properties are deteriorated. Similar effects also occur during disconnection since the magnetizing current is forced to stop flowing, and frequent connection/disconnection hence reduces transformer reliability and lifetime.

In the art, a series choke has been used to limit the inrush current. However, this requires a bulky additional component the design of which has to be adapted to the specific transformer requirements.

SUMMARY OF THE INVENTION

A general object of the present invention is to solve or at least mitigate the above described problems in the art.

In a first aspect of the present invention these objects are achieved by a system for distributing electric power to an electrical grid. The system comprises a DC/AC inverter arranged to convert a DC voltage output from a power generator to an AC voltage, a transformer arranged to receive said AC voltage, transform said AC voltage and deliver the transformed AC voltage to the electrical grid, and a connector arranged to selectively connect and disconnect the transformer from the grid. The DC/AC inverter is arranged to control primary winding magnetizing current delivered to the transformer, and the connector is arranged to selectively connect and disconnect the transformer to the grid on the basis of the controlled magnetizing current.

In a second aspect of the present invention these objects are achieved by a method of distributing electric power to an electrical grid. The method comprises the steps of converting a DC voltage output from a power generator to an AC voltage, transforming said AC voltage in a transformer and delivering the transformed AC voltage to the grid. Further, the method comprises the steps of controlling primary winding magnetizing current delivered to the transformer and selectively connecting and disconnecting the grid from the transformer on the basis of the controlled magnetizing current.

In a third aspect of the present invention these objects are achieved by a computer program product comprising computer-executable components for causing a device to perform the steps of the method of the present invention when the computer-executable components are run on a processing unit included in the device.

In a fourth aspect of the present invention these objects are achieved by a computer program product comprising a computer readable medium storing program code which when executed performs the method according to the present invention.

Thus, the present invention is advantageous in that the DC-AC inverter controls primary winding magnetizing current of the transformer, and the connector is arranged to selectively connect the electrical grid to or disconnect the electrical grid from the transformer on the basis of the controlled magnetizing current. By having the inverter control the magnetizing current and connecting/disconnecting the electrical grid to/from the transformer on the basis of the carefully controlled current, i.e. operating the connector when the magnetizing current has been stabilized at levels considered safe, inrush current flow to the transformer can be greatly reduced or eliminated.

In an exemplifying embodiment, when the electric power generator (being for example a PV array) starts producing enough power—typically early morning—the DC-AC inverter slowly increases primary winding magnetizing current of the transformer. When it is considered safe to connect the pre-energized load, being for instance a distribution grid, a connector embodied in the form of e.g. a switch connects the secondary side of the transformer to the electrical grid and the inverter starts operating in a power transfer mode.

Hence, the DC/AC inverter controls the magnetizing current and when the current has stabilized, the grid is connected to the transformer. When the PV array power output falls below a predetermined threshold value, typically at the end of the day, the connector disconnects the transformer from the grid. The inverter thus goes into a grid disconnection mode and remains in this mode until the PV array starts producing enough power again.

In a further exemplifying embodiment, if the electrical grid needs to be disconnected due to e.g. maintenance, the inverter decreases the magnetizing current and when considered safe, i.e. when the magnetizing current has been decreased to and stabilized at a level where inrush current in the transformer can be greatly reduced or avoided, the transformer is disconnected from the grid. After finished maintenance, the inverter increases the magnetizing current and the electrical grid is connected to the transformer when the current has stabilized at a certain level where inrush currents will be avoided.

By carefully controlling magnetizing current before the electrical grid is connected to (or disconnected from) the transformer, inrush current flow to the transformer is reduced or avoided.

In an embodiment of the present invention the DC/AC inverter is further arranged to control increase of primary winding magnetizing current delivered to the transformer such that current increase per time unit complies with a predetermined increase rate, and the connector is further arranged to connect the transformer to the grid when the magnetizing current has stabilized at a certain level.

Again, when the PV array starts producing enough power early morning, or e.g. when maintenance has been carried out, the DC-AC inverter slowly increases primary winding magnetizing current of the transformer with a controlled di/dt. Thus, current increase per time unit should comply with a predetermined increase rate when the generated power exceeds the predetermined threshold value. When it is considered safe to connect the pre-energized load, being for instance a distribution grid, the connector connects the secondary side of the transformer to the electrical grid and the inverter starts operating in a power transfer mode. The increase rate for the current may be in the order of milliseconds up to several seconds depending on configuration of the power system. Hence, the DC/AC inverter controls the magnetizing current and in particular its rate of increase, and when the current has stabilized at a predetermined level, the grid is connected to the transformer. In analogy with the above, when the PV array power output falls below the predetermined threshold at the end of the day, or when maintenance is to commence, the connector disconnects the transformer from the grid. The inverter thus goes into a grid disconnection mode and remains in this mode until the PV array starts producing enough power again.

Advantageously, this further facilitates reduction of the inrush current flow to the transformer.

In an embodiment of the present invention the DC/AC inverter is further arranged to control decrease of the primary winding magnetizing current delivered to the transformer such that current decrease per time unit complies with a predetermined decrease rate. As previously mentioned, this embodiment improves transformer reliability and lifetime.

It should be noted that the predetermined threshold value could be embodied in the form of a first and a second predetermined threshold value. The first predetermined threshold value which the generated power is to exceed for the electrical grid to be connected is in that case set higher than a second predetermined threshold value which the generated power is to fall below for the electrical grid to be disconnected, such that a measure of hysteresis is introduced in the system.

In a further embodiment of the present invention, the DC/AC inverter is a grid-tie inverter arranged to synchronize sine wave power signals output from the inverter to sine wave power signals at the electrical grid before connecting the grid to the transformer. This further mitigates possible inrush currents.

It should further be noted that, as has been mentioned in the above, the increase or decrease rate for the magnetizing current may be in the order of milliseconds up to several seconds depending on configuration of the power system. However, the actual value of the rate of change of magnetizing current is in general not in itself a critical parameter; when increasing the current, the grid should be connected to the transformer once the current has stabilized at a level where inrush current is reduced or eliminated. In an analog manner, when decreasing the current, the grid should be disconnected from the transformer once the current has stabilized at a level where inrush current is reduced or eliminated.

Additional features and advantages will be disclosed in the following.

BRIEF DESCRIPTION OF THE DRAWINGS

Embodiments of the present invention and advantages thereof will now be described by way of non-limiting examples, with reference to the accompanying drawings in which.

DETAILED DESCRIPTION OF THE INVENTION

Figure 1:
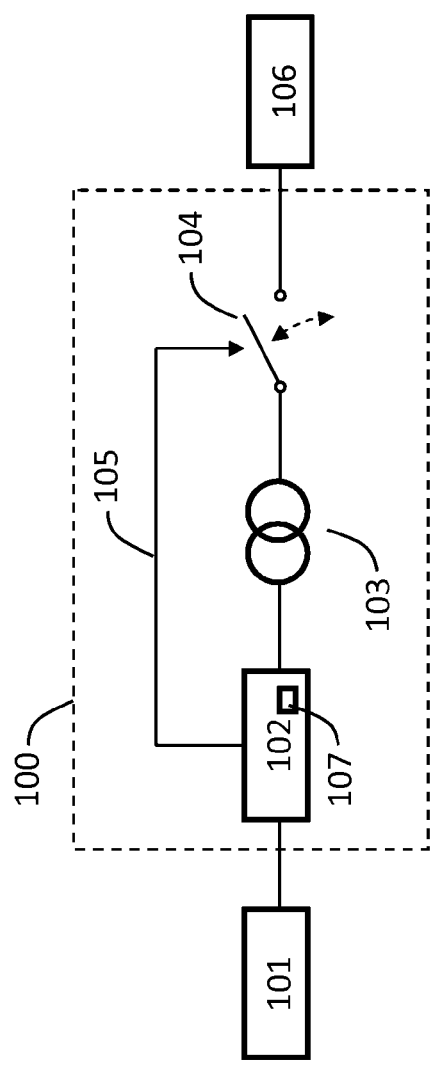
FIG. 1 shows a block scheme illustrating an embodiment of the present invention.

FIG. 1 illustrates a system 100 according to an embodiment of the present invention. The system 100 for distributing electric power to a distribution grid 106 comprises a DC/AC inverter 102 for converting a DC voltage output from electric power generator 101 (typically a PV array) to an AC voltage. The power generator 101 is in the following exemplified by means of a PV array, but could be any generator which occasionally stops producing power during some time of the day. Further, the system comprises transformer 103 which receives the AC voltage and transforms, in this example steps up, the AC voltage to the grid 106. In an exemplifying implementation, the output of the PV array is 600-1000V DC and the converted AC voltage from the inverter is 400V at 100 kW, while the stepped-up transformer voltage is 10 kV-20 kV. Finally, the system 100 comprises a connector 104, which may be embodied in the form of a switch, for selectively connecting and disconnecting the transformer from the grid. The closing and opening of the switch is controlled 105 by the DC/AC inverter 102.

The DC/AC inverter is arranged to control increase of primary winding magnetizing current delivered to the transformer such that current increase per time unit complies with a predetermined increase rate when the PV array 101 produces enough power, typically early morning as the sun rises. This is to reduce or even eliminate inrush current flow in the primary winding of the transformer. When the magnetizing current has stabilized, the DC/AC inverter 102 controls 105 the connector 104 to connect the transformer to the grid and power is transferred from the PV array to the grid.

Advantageously, this greatly reduces the inrush current flow to the transformer.

When the PV array stops producing power, typically in the evening as the sun sets, the DC/AC inverter is arranged to control operation of the connector such that the grid is disconnected from the transformer. The inverter then shuts down and remains in this mode during the night.

Advantageously, before disconnecting the grid from the transformer, the DC/AC inverter slowly decreases the transformer magnetizing current in a controlled manner.

In this exemplifying embodiment, the functionality to monitor PV array power output, control the increase of magnetizing current and operate the connector is implemented in the DC/AC inverter, but could just as well be implemented in some other appropriate power device in connection to the DC/AC inverter, for example in a control device supervising the complete power system. Further, this functionality can be implemented by means of software downloaded into a processing device 107 of the DC/AC inverter. This facilitates swift and straightforward updates and modifications of inverter functionality without having to modify inverter hardware. Further, the DC/AC inverter could comprise a user-operated interface where control commands can be received to control increase/decrease of transformer magnetizing current and possibly also connection/disconnection of the electrical grid.

With PV panels the DC/AC inverter can control inverter output power by changing operating power point on the V-I curve of the panel. It is thereby possible to adjust the output power of the inverter under any condition, within the frames of PV panel operating voltage and current.

Figure 2:
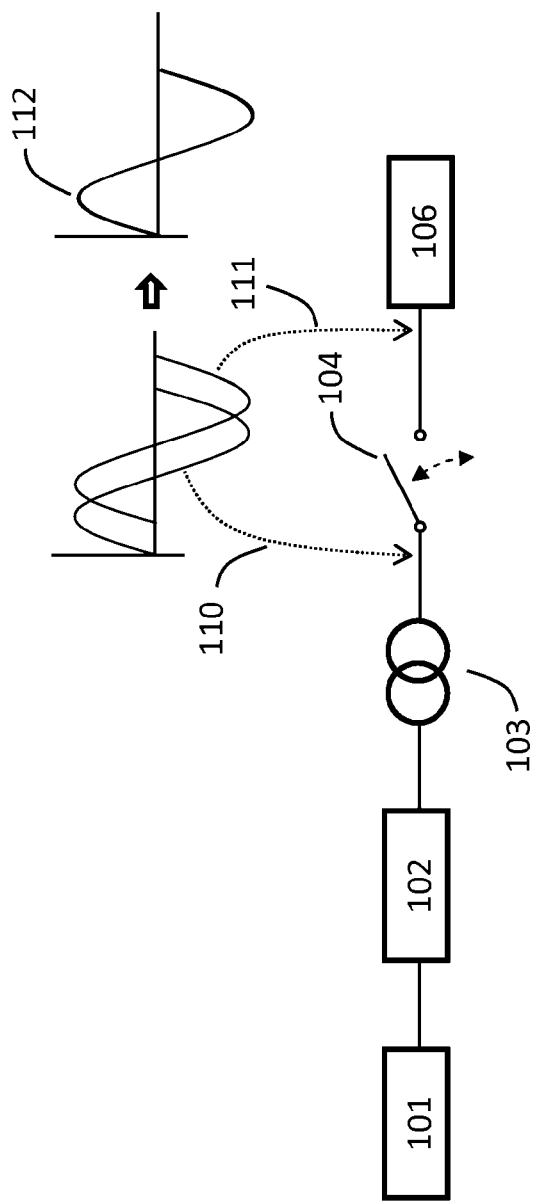
FIG. 2 shows a block scheme illustrating a further embodiment of the present invention.

FIG. 2 illustrates the system of FIG. 1 (control line 105 has been omitted), and the need for synchronization when connecting the transformer 103 and the DC/AC inverter 102 to the distribution grid 106. It should be noted that the grid typically is a 3-phase network with three terminals carrying a respective sine wave voltage signal, each one a 120 degrees out of phase with the remaining two. For illustrational purposes, one phase is shown.

As can be seen at 110 on the transformer side of connector 104, and at 111 on the grid side, the power signals coming out from the inverter may not be in phase with the power signals on the grid, but must be synchronized or a large inrush current will flow upon connection. Thus, a so called grid-tie inverter could be used. The grid-tie inverter monitors the power signals on the grid side (this functionality could be included via control line 105), and ensures that the sine wave power signals output from the inverter stays in phase with those of the grid as is illustrated at 112. Consequently, upon connection of the grid 106 to the transformer 103 via the connector 104, the three-phase voltages output from the transformer will have the same phase and amplitude as those of the grid. It should be noted that other suitable inverters alternatively could be used for synchronizing purposes.

Figure 3:
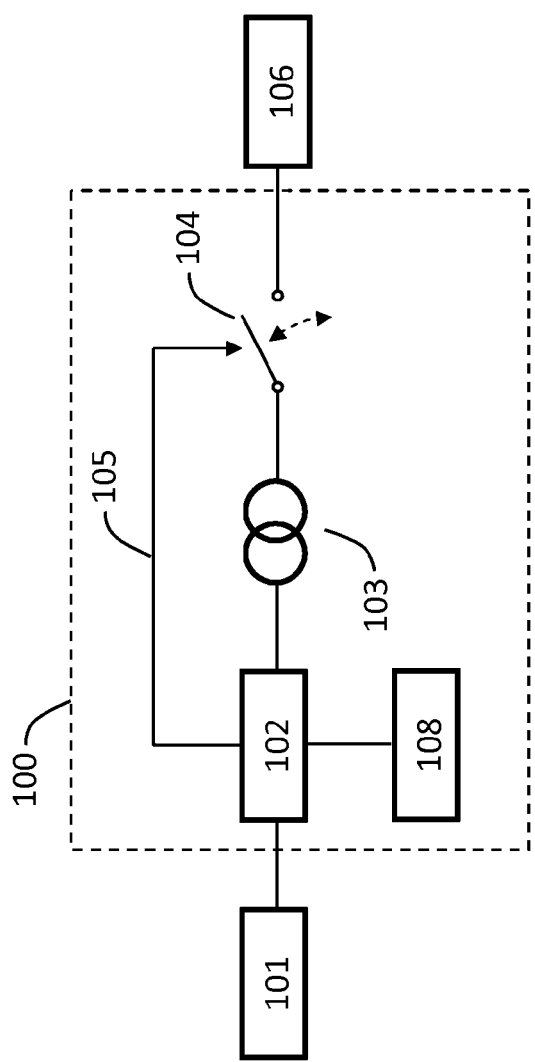
FIG. 3 shows a block scheme illustrating yet a further embodiment of the present invention.

FIG. 3 illustrates the system of FIGS. 1 and 2 (processing device 107 has been omitted), further comprising a power source 108 arranged to power the DC/AC inverter 102 and thus to provide the magnetizing current to the transformer 103. This embodiment is advantageous since the operation of the DC/AC inverter is not dependent on power output from the generator 101. As a result, even though the generator being e.g. a solar panel does not provide enough energy to power the inverter, the inverter will still be able to operate. Further, the power source 108 could comprise energy storage functionality to appropriately store energy from the power generator 101 and subsequently energize the inverter 102 in case the power generator does not produce enough power.

The skilled person in the art realizes that the present invention by no means is limited to the examples described hereinabove. On the contrary, many modifications and variations are possible within the scope of the appended claims.

What is claimed is:

1. A system for distributing electric power to an electrical distribution grid, comprising:
   a DC/AC inverter arranged to convert a DC voltage output from a power generator to an AC voltage,
   a transformer electrically connected to said DC/AC inverter and receiving said AC voltage, said transformer transforming said AC voltage and delivering the transformed AC voltage to the electrical distribution grid, and
   a connector electrically connected to said transformer and selectively connecting and disconnecting the transformer from the distribution grid, wherein
   said DC/AC inverter electrically connected to said connector and controlling an increase and a decrease of primary winding magnetizing current delivered to the transformer, and
   the connector selectively connects and disconnects the transformer to and from the distribution grid on the basis of the controlled magnetizing current, such that the transformer is connected to the distribution grid when the magnetizing current has increased to and stabilized at a certain level where inrush currents are reduced or avoided, and the transformer is disconnected when the magnetizing current has decreased to and stabilized at a certain level where inrush currents are reduced or avoided.

2. The system according to claim 1, wherein the DC/AC inverter further is arranged to control increase of primary winding magnetizing current delivered to the transformer such that current increase per time unit complies with a predetermined increase rate.

3. The system according to claim 1, wherein the DC/AC inverter further is arranged to control decrease of the primary winding magnetizing current delivered to the transformer such that current decrease per time unit complies with a predetermined decrease rate, and
the connector is further arranged to disconnect the transformer from the distribution grid when the magnetizing current has stabilized at a certain level.

4. The system according to claim 1, wherein (a) increase of primary winding magnetizing current delivered to the transformer is performed when the generated power exceeds a predetermined threshold value, and (b) decrease of the primary winding magnetizing current delivered to the transformer is performed when the generated electric power falls below the predetermined threshold value.

5. The system according to claim 1, wherein the DC/AC inverter is arranged to control the connector to connect and disconnect the electrical distribution grid.

6. The system according to claim 1, wherein a first predetermined threshold value which the generated power is to exceed for the electrical distribution grid to be connected is set higher than a second predetermined threshold value which the generated power is to fall below for the electrical distribution grid to be disconnected.

7. The system according to claim 1, wherein the DC/AC inverter is a grid-tie inverter arranged to synchronize sine wave power signals output from the inverter to sine wave power signals at the electrical distribution grid before connecting the distribution grid to the transformer.

8. The system according to claim 1, further comprising:
a power source arranged to power the DC/AC inverter.

9. The system according to claim 8, wherein the power source further comprises:
energy storage element arranged to store power provided by the power generator.

10. A method of distributing electric power to an electrical distribution grid, comprising:
converting a DC voltage output from a power generator to an AC voltage,
transforming said AC voltage in a transformer and delivering the transformed AC voltage to the distribution grid,
controlling increase and decrease of primary winding magnetizing current delivered to the transformer,
connecting the distribution grid to the transformer when the magnetizing current has increased to and stabilized at a certain level where inrush currents are reduced or avoided, and
disconnecting the distribution grid from the transformer when the magnetizing current has decreased to and stabilized at a certain level where inrush currents are reduced or avoided.

11. The method according to claim 10, wherein the step of controlling primary winding magnetizing current further comprises:
controlling increase of primary winding magnetizing current delivered to the transformer such that current increase per time unit complies with a predetermined increase rate.

12. The method according to claim 10, wherein the step of controlling primary winding magnetizing current further comprises:

controlling decrease of the primary winding magnetizing current delivered to the transformer such that current decrease per time unit complies with a predetermined decrease rate, and the disconnection of the transformer from the distribution grid is performed when the magnetizing current has stabilized at a certain level.

13. The method according to claim 10, further comprising the step of:

synchronizing the converted AC voltage to an AC voltage at the electrical distribution grid before connecting the distribution grid to the transformer.

14. A computer program product comprising a non-transitory computer readable medium storing computer-executable components for causing a device to perform a method of distributing electric power to an electrical distribution grid when the computer-executable components are run on a processing unit included in the device, the method comprising the steps of:

converting a DC voltage output from a power generator to an AC voltage, transforming said AC voltage in a transformer and delivering the transformed AC voltage to the distribution grid, controlling increase and decrease of primary winding magnetizing current delivered to the transformer, connecting the distribution grid to the transformer when the magnetizing current has increased to and stabilized at a certain level where inrush currents are reduced or avoided, and disconnecting the distribution grid from the transformer when the magnetizing current has decreased to and stabilized at a certain level where inrush currents are reduced or avoided.

15. A computer program product comprising a non-transitory computer readable medium storing program code which when executed performs a method of distributing electric power to an electrical distribution grid, comprising the steps of:

converting a DC voltage output from a power generator to an AC voltage, transforming said AC voltage in a transformer and delivering the transformed AC voltage to the distribution grid, controlling increase and decrease of primary winding magnetizing current delivered to the transformer, connecting the distribution grid to the transformer when the magnetizing current has increased to and stabilized at a certain level where inrush currents are reduced or avoided, and disconnecting the distribution grid from the transformer when the magnetizing current has decreased to and stabilized at a certain level where inrush currents are reduced or avoided.

* * * * *